US010137501B2

(12) United States Patent
Nakajima et al.

(10) Patent No.: US 10,137,501 B2
(45) Date of Patent: Nov. 27, 2018

(54) METHOD FOR MANUFACTURING MICROPORE FILTER

(71) Applicant: PURERON JAPAN CO., LTD., Iwaki-shi, Fukushima (JP)

(72) Inventors: Hidetoshi Nakajima, Fukushima (JP); Toshio Miura, Fukushima (JP); Miyabi Katano, Fukushima (JP); Nozomi Igarashi, Fukushima (JP)

(73) Assignee: PURERON JAPAN CO., LTD., Iwaki-Shi (JP)

( * ) Notice: Subject to any disclaimer, the term of this patent is extended or adjusted under 35 U.S.C. 154(b) by 410 days.

(21) Appl. No.: 15/100,066

(22) PCT Filed: Nov. 26, 2014

(86) PCT No.: PCT/JP2014/081237
§ 371 (c)(1),
(2) Date: May 27, 2016

(87) PCT Pub. No.: WO2015/098406
PCT Pub. Date: Jul. 2, 2015

(65) Prior Publication Data
US 2017/0028474 A1    Feb. 2, 2017

(30) Foreign Application Priority Data

Dec. 25, 2013  (JP) ................................ 2013-267956

(51) Int. Cl.
*B22F 3/11*    (2006.01)
*B01D 39/20*   (2006.01)
(Continued)

(52) U.S. Cl.
CPC ............ *B22F 3/1109* (2013.01); *B01D 39/20* (2013.01); *B01D 61/147* (2013.01);
(Continued)

(58) Field of Classification Search
CPC .......... B22F 2998/10; B22F 3/20; B22F 9/04; B22F 3/02; B22F 3/10; B22F 1/0055;
(Continued)

(56) References Cited

U.S. PATENT DOCUMENTS

| 2007/0140890 A1* | 6/2007 | Bischoff | ............... | B22F 3/1146 419/7 |
| 2013/0075953 A1* | 3/2013 | Casari | ....................... | B22F 3/02 264/328.14 |

FOREIGN PATENT DOCUMENTS

| EP | 0262418 | * | 4/1988 |
| JP | 56-150155 | | 11/1981 |

(Continued)

OTHER PUBLICATIONS

International Search Report, dated Feb. 17, 2015 (Feb. 17, 2015).

*Primary Examiner* — Colleen P Dunn
*Assistant Examiner* — Nicholas A Wang
(74) *Attorney, Agent, or Firm* — Rankin, Hill & Clark LLP

(57) ABSTRACT

Provided is a method for manufacturing a micropore filter usable as SCE. Stainless steel particles having particle diameters of 3 to 60 μm are subjected to milling in a bead mill using zirconia beads to prepare powder having a flakiness of 0.03 to 0.4. The zirconia adhered to the surface of the powder is removed by pickling. A load of 10 to 15 kN is applied to 0.5 to 1.0 g of the pickled powder, thereby compacting the powder into a columnar compact body. The compact body is kept and fired in a vacuum atmosphere of $10^{-5}$ to $10^{-3}$ Pa at a temperature of 1000 to 1300° C. for 1 to 3 hours to form a sintered body. The sintered body is pressed into a pipe having an inner diameter of 0.90 to 0.99 times of the outer diameter of the sintered body, and extruded to obtain a micropore filter.

1 Claim, 4 Drawing Sheets

(51) Int. Cl.
    *C22C 33/02*     (2006.01)
    *B22F 1/00*     (2006.01)
    *B01D 67/00*     (2006.01)
    *B01D 71/02*     (2006.01)
    *B01D 61/14*     (2006.01)
    *B22F 3/16*     (2006.01)
    *B22F 3/20*     (2006.01)
    *B22F 9/04*     (2006.01)
    *C23G 1/08*     (2006.01)

(52) U.S. Cl.
    CPC ....... *B01D 67/0041* (2013.01); *B01D 71/022* (2013.01); *B22F 1/0055* (2013.01); *B22F 3/11* (2013.01); *B22F 3/16* (2013.01); *B22F 3/20* (2013.01); *B22F 9/04* (2013.01); *C22C 33/02* (2013.01); *C23G 1/083* (2013.01); *C23G 1/085* (2013.01); *C23G 1/088* (2013.01); *B01D 2325/02* (2013.01); *B22F 2009/043* (2013.01); *B22F 2302/45* (2013.01); *B22F 2998/10* (2013.01)

(58) Field of Classification Search
    CPC .. B22F 2009/043; B22F 2302/45; B22F 3/11; B22F 3/1109; B01D 2325/02; B01D 39/20; B01D 61/147; B01D 67/0041; B01D 71/022
    See application file for complete search history.

(56) References Cited

FOREIGN PATENT DOCUMENTS

| | | | |
|---|---|---|---|
| JP | 2000-063967 | | 2/2000 |
| JP | 2000063967 | * | 2/2000 |
| JP | 2011-047855 | | 3/2011 |
| JP | 2012-154720 | | 8/2012 |
| JP | 2013-156273 | | 8/2013 |

* cited by examiner

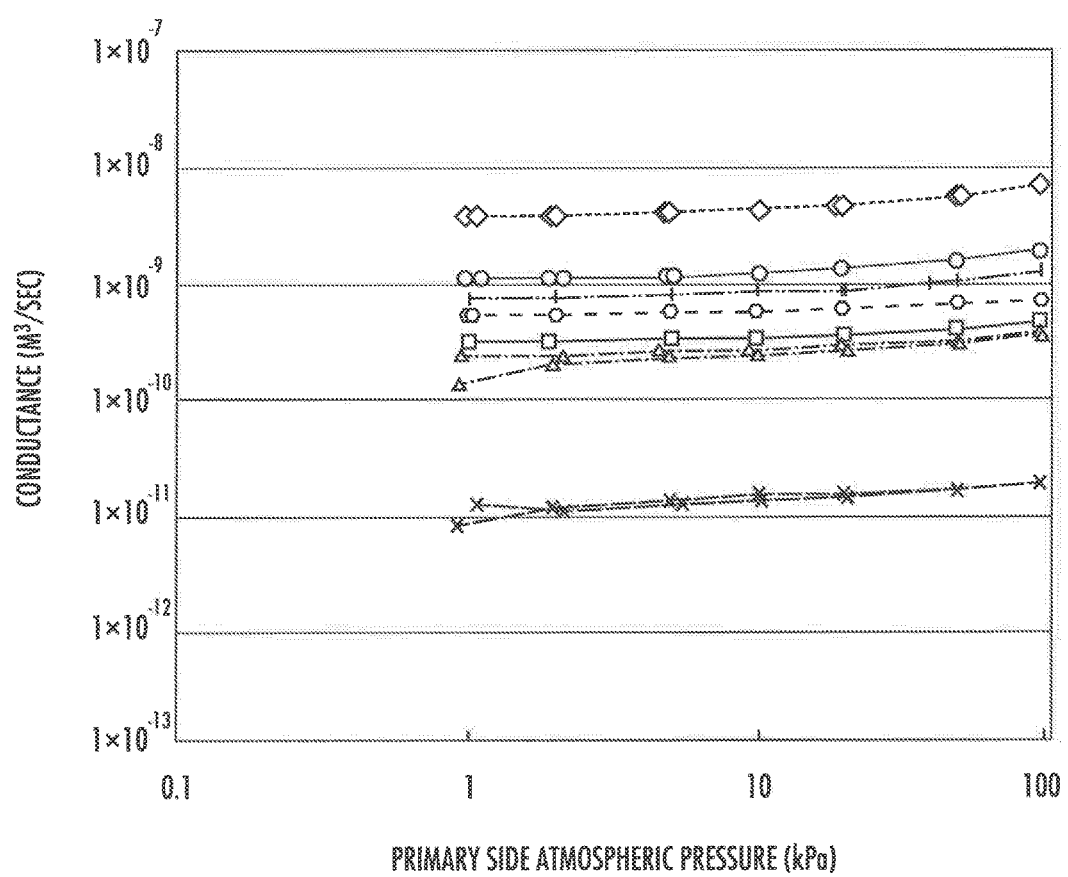

METHOD FOR MANUFACTURING MICROPORE FILTER

TECHNICAL FIELD

The present invention relates to a method of manufacturing a micropore filter used for calibration of vacuum gauges such as ionization vacuum gauges and diaphragm vacuum gauges for measuring high vacuum or ultrahigh vacuum, high vacuum pumps, material for vacuum, or the like.

BACKGROUND ART

Vacuum gauges such as ionization vacuum gauges and diaphragm vacuum gauges for measuring high vacuum or ultrahigh vacuum, high vacuum pumps, material for vacuum, or the like require calibration at the present position where they are actually used (in-situ calibration). The in-situ calibration is performed by measuring the degree of vacuum inside a vacuum container in which a gas of a reference flow rate is introduced, and there is proposed to use a standard conductance element (SCE) in order to introduce the gas of the reference flow rate into the vacuum container (for example, refer to Patent Literature 1).

CITATION LIST

Patent Literature

Patent Literature 1: Japanese Patent Laid-Open No. 2013-156273

SUMMARY OF INVENTION

Technical Problem

The standard conductance element is, for example, composed of a micropore filter having a pore diameter of 1 μm or less, and can make the gas passing through the filter to become a molecular flow. It is desirable to keep the gas flow rate (conductance ($m^3$/sec)) per unit time at the secondary side to be constant regardless of the gas pressure at the primary side.

In view of the above circumstances, it is an object of the present invention to provide a manufacturing method of a micropore filter which can be used as the standard conductance element.

Solution to Problem

In order to achieve the object, a method for manufacturing a micropore filter of the present invention includes: a step of treating stainless steel particles having particle diameters in a range of 3 to 60 μm in a bead mill using zirconia beads to prepare powder having a flakiness expressed by a ratio of a thickness with respect to a long diameter (thickness/long diameter) in a range of 0.03 to 0.4; a step of pickling the powder to remove zirconia adhered to a surface of the powder due to treatment in the bead mill; a step of applying a load of 10 to 15 kN to 0.5 to 1.0 g of the powder after the pickling, thus compacting the powder to obtain a compact body having a columnar shape; a step of keeping the compact body in a vacuum atmosphere in a range of $10^{-5}$ to $10^{-3}$ Pa at a temperature in a range of 1000 to 1300° C. for 1 to 3 hours, thus firing the compact body to obtain a sintered body; and a step of pressing the sintered body into a pipe having an inner diameter in a range of 0.90 to 0.99 times of an outer diameter of the sintered body, and extruding the sintered body.

According to the method for manufacturing the micropore filter of the present invention, first the stainless steel particles having particle diameters in a range of 3 to 60 μm is treated in a bead mill using zirconia beads, and a powder having a flakiness expressed by a ratio of a thickness with respect to a long diameter (thickness/long diameter) in a range of 0.03 to 0.4 is prepared.

When the particle diameter of the stainless steel particles exceeds 60 μm, the flakiness of the obtained powder cannot be made to be within the above range. Moreover, when the particle diameter of the stainless steel particles is less than 3 μm, the treatment by the bead mill becomes difficult.

When the flakiness exceeds 0.4, the micropore filter having the desired performance cannot be obtained. Moreover, it is technically difficult to make the flakiness less than 0.03.

When performing the treatment by the bead mill, zirconia is adhered to the surface of the powder, and the micropore filter having the desired performance cannot be obtained by using such powder. In this regard, in the method for manufacturing the micropore filter of the present invention, next, zirconia adhered to the surface of the powder is dissolved and removed by pickling the powder.

According to the method for manufacturing the micropore filter of the present invention, next, a load of 10 to 15 kN is applied to 0.5 to 1.0 g of the powder after the pickling, thus compacting the powder to obtain a compact body having a columnar shape. When a load exceeding 15 kN is applied to 0.5 g of the powder, the space between the powders become dense, and the micropore filter having the desired performance cannot be obtained. Moreover, when a load of less than 10 kN is applied to 1.0 g of the powder, the compacting becomes difficult and the compact body cannot be obtained.

According to the method for manufacturing the micropore filter of the present invention, next, the compact body is held in a vacuum atmosphere in a range of $10^{-5}$ to $10^{-3}$ Pa at a temperature in a range of 1000 to 1300° C. for 1 to 3 hours, thus firing the compact body to obtain a sintered body. When the vacuum atmosphere exceeds $10^{-3}$ Pa, the powder is oxidized, and therefore a micropore filter having the desired performance cannot be obtained. Furthermore, there is no need to make the vacuum atmosphere less than $10^{-5}$ Pa, and no further effect can be obtained.

When the compact body is held at a temperature exceeding 1300° C. for more than 3 hours, the obtained sintered body is excessively sintered, and the micropore filter having the desired performance cannot be obtained. Moreover, when the compact body is held at a temperature less than 1000° C. for less than 1 hour, the compact body cannot be sufficiently fired.

According to the method for manufacturing the micropore filter of the present invention, next, the sintered body is pressed into and extruded from a pipe having an inner diameter in a range of 0.90 to 0.99 times of an outer diameter of the sintered body, and thus the micropore filter can be obtained. When the inner diameter of the pipe exceeds 0.99 times with respect to the outer diameter of the sintered body, the micropore filter having the desired performance cannot be obtained. Moreover, when the inner diameter of the pipe is less than 0.90 times with respect to the outer diameter of the sintered body, it becomes difficult to press the sintered body into the pipe.

BRIEF DESCRIPTION OF DRAWINGS

FIG. 4 is a graph showing the conductance of the micropore filter measured by the device illustrated in FIG. 3.

DESCRIPTION OF EMBODIMENT

Next, an embodiment of the present invention is explained in more details with reference to the accompanying drawings.

Figure 1:
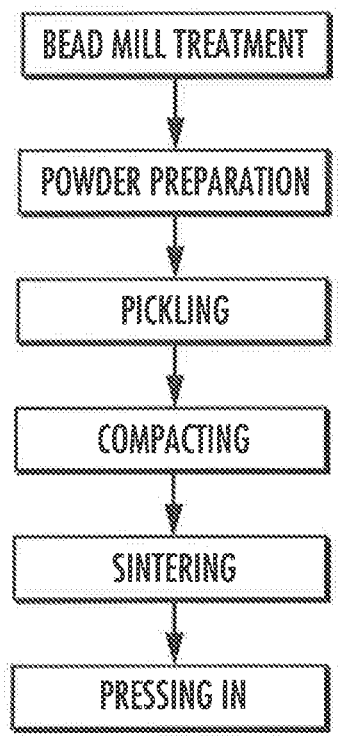
FIG. 1 is a flowchart showing manufacturing steps in a method for manufacturing a micropore filter of the present invention.

As shown in FIG. 1, in a method for manufacturing a micropore filter of the present embodiment, first, stainless steel particles having a particle diameter in a range of 3 to 60 μm are treated in a bead mill (for example, New Visco Mill NVM type (trade name) manufactured by AIMEX Corp., LTD.) using zirconia beads. As the stainless steel, for example, SUS316L can be used, and the particles produced by, for example, atomizing method can be used.

The above treatment can be performed by feeding a slurry in which 1 kg of stainless steel particles being dispersed in 5 liters of water, at a flow rate of 0.5 kg/min to the bead mill filled with zirconia beads having a diameter of 2 mm at a ratio of approximately 80 vol. %, and then rotating the bead mill at a peripheral speed of 10 m/sec. for 30 to 120 minutes. As a result, powders composed of the stainless steel and having flakiness in a range of 0.03 to 0.4 can be obtained.

Figure 2:
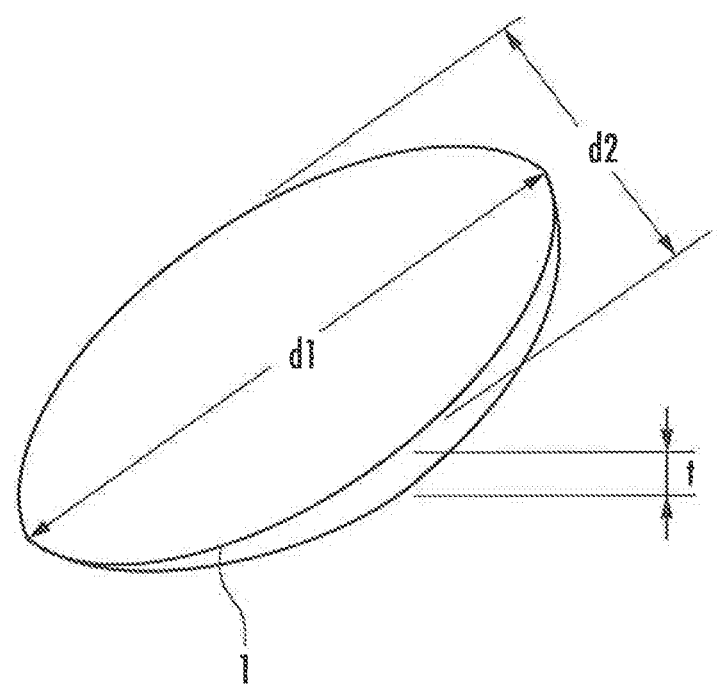
FIG. 2 is a perspective diagram illustrating a shape of powder obtained by a treatment with bead mill.

As shown in FIG. 2, the powder 1 has a flat shape with a maximum length of a long diameter d1, a maximum width of a short diameter d2, and a maximum thickness t. Here, in the present invention, flakiness is defined as a ratio of the thickness t with respect to the long diameter d1, which is t/d1.

Zirconia derived from the zirconia beads is adhered to the surface of the powder obtained by the treatment with the bead mill, and if used in this state, a desired performance cannot be obtained when processed as the micropore filter.

In this regard, in the method for manufacturing the micropore filter of the present embodiment, next, as shown in FIG. 1, the powder is subjected to pickling. Pickling is performed by, for example, adding water to nitric acid 200 g, hydrochloric acid 100 g, phosphoric acid 300 g, and acetic acid 100 g so that the total amount of the acid liquid is 1000 ml, and heating the acid liquid to a temperature in a range of 50 to 80° C., and then immersing the powder for a time in a range of 10 to 30 minutes. As a result, the zirconia is dissolved in the acid liquid thereby being removed. After the pickling, the powder is washed by water, and then dried.

Next, a load of 10 to 15 kN is applied to 0.5 to 1.0 g of the powder after being pickled, thus compacting the powder to obtain a compact body having a columnar shape, for example, having a diameter in a range of 5.0 to 5.2 mm and a length in a range of 4.8 to 5.0 mm. The compacting can be performed by using, for example, a servo press device.

Next, the compact body is kept in a vacuum atmosphere in a range of $10^{-5}$ to $10^{-3}$ Pa at a temperature in a range of 1000 to 1300° C. for 1 to 3 hours, thus firing the compact body to obtain a sintered body. The sintering can be performed by using, for example, a vacuum atmosphere furnace.

Next, the sintered body is pressed into a pipe having an inner diameter in a range of 0.90 to 0.99 times of an outer diameter of the sintered body, and then extruded, thereby obtaining a micropore filter. The press in can be performed by using, for example, a servo press device.

Figure 3:
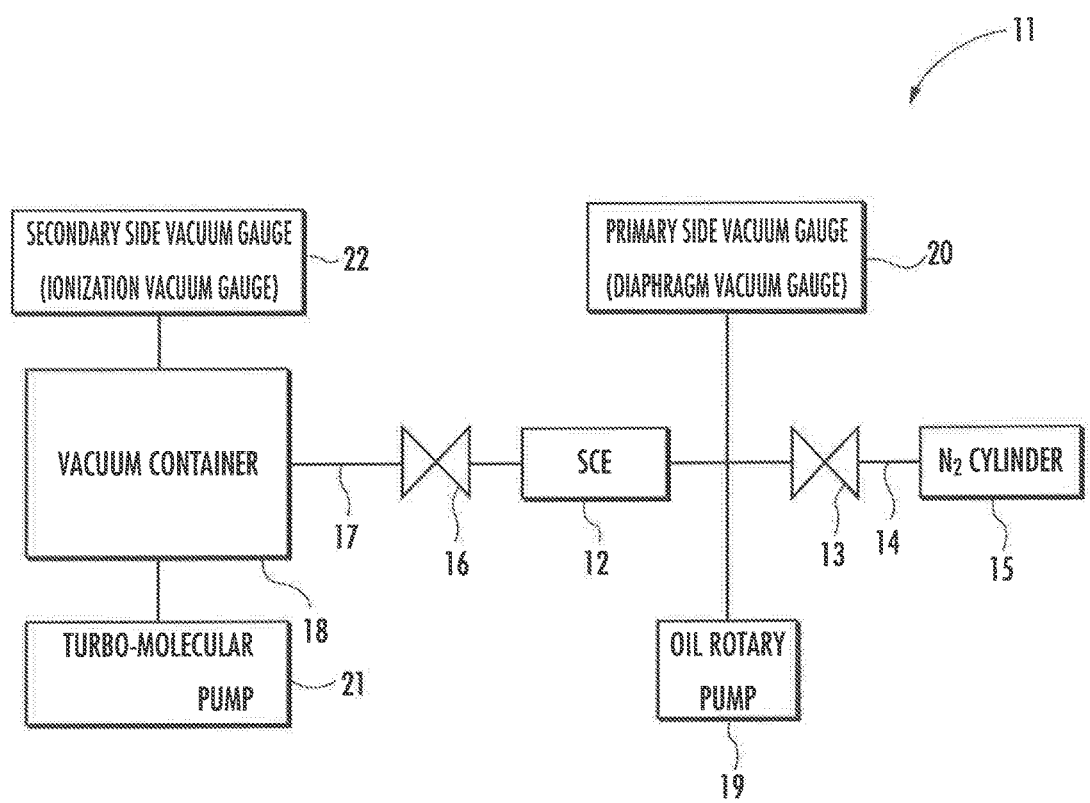
FIG. 3 is a system configuration diagram illustrating a configuration of a measuring device for measuring conductance of the micropore filter.

The conductance (m³/sec) of the micropore filter obtained by the manufacturing method of the present embodiment can be measured by using, for example, a measuring device 11 illustrated in FIG. 3. The measuring device 11 includes, a nitrogen gas cylinder 15 connected to the primary side (upstream side) of the micropore filter as the standard conductance element (SCE) by a conduit 14 via a switching valve 13, and a vacuum container 18 connected to the secondary side (downstream side) of the micropore filter 12 by a conduit 17 via a switching valve 16.

Moreover, an oil rotary pump 19 and a diaphragm vacuum gauge 20 as the primary side vacuum gauge are connected to the conduit 14 between the micropore filter 12 and the switching valve 13. Furthermore, a turbo-molecular pump 21 and an ionization vacuum gauge 22 as the secondary side vacuum gauge are connected to the vacuum container 18. Here, both of the oil rotary pump 19 and the turbo-molecular pump 21 are vacuum pumps.

Next, the method for measuring the conductance of the micropore filter 12 by the measuring device 11 is explained.

When measuring the conductance of the micropore filter 12 by the measuring device 11, first, in a state in which the switching valve 13 is closed and the switching valve 16 is opened, the oil rotary pump 19 and the turbo-molecular pump 21 are activated to sufficiently decompress the primary side and the secondary side of the micropore filter 12. At this time, the atmospheric pressure at the primary side of the micropore filter 12 measured by the diaphragm vacuum gauge 20 is indicated as P1, and the atmospheric pressure at the secondary side of the micropore filter 12 measured by the ionization vacuum gauge 22 is indicated as P2.

Next, while the turbo-molecular pump 21 is kept activated, the oil rotary pump 19 is stopped, and the switching valve 13 is opened to supply nitrogen gas from the nitrogen gas cylinder 15, and the atmospheric pressure at the primary side of the micropore filter 12 is gradually recovered. At this time, the atmospheric pressure at the secondary side of the micropore filter 12 measured by the ionization vacuum gauge 22 is indicated as P02 with respect to the atmospheric pressure P01 at the primary side of the micropore filter 12 measured by the diaphragm vacuum gauge 20.

Then, the exhaust rate of the turbo-molecular pump 21 being indicated as A (m³/sec), the conductance of the micropore filter 12 is measured according to the following equation.

$$\text{Conductance (m}^3\text{/sec)} = \{(P02-P2)/(P01-P1) \times 1000\} \times A$$

The conductance was measured by using the measuring device 11 for 9 types of micropore filters obtained according to the manufacturing method of the present embodiment. The results are shown in FIG. 4.

From FIG. 4, it is clear that all of the micropore filters obtained by the manufacturing method of the present embodiment have approximately constant conductance regardless of the pressure at the primary side, and can be used as the standard conductance element (SCE).

EXPLANATION OF REFERENCE NUMERALS

11 . . . measuring device, 12 . . . micropore filter, 15 . . . nitrogen gas cylinder, 18 . . . vacuum container, 19 . . . oil rotary pump, 20 . . . diaphragm vacuum gauge, 21 . . . turbo-molecular pump, 22 . . . ionization vacuum gauge

The invention claimed is:

1. A method for manufacturing a micropore filter comprising:
   a step of treating stainless steel particles having particle diameters in a range of 3 to 60 μm in a bead mill using zirconia beads to prepare powder having a flakiness expressed by a ratio of a thickness with respect to a long diameter (thickness/long diameter) in a range of 0.03 to 0.4;
   a step of pickling the powder to remove zirconia adhered to a surface of the powder due to treatment in the bead mill;
   a step of applying a load of 10 to 15 kN to 0.5 to 1.0 g of the powder after the pickling, thus compacting the powder to obtain a compact body having a columnar shape;
   a step of keeping the compact body in a vacuum atmosphere in a range of $10^{-5}$ to $10^{-3}$ Pa at a temperature in a range of 1000 to 1300° C. for 1 to 3 hours, thus firing the compact body to obtain a sintered body; and
   a step of pressing the sintered body into a pipe having an inner diameter in a range of 0.90 to 0.99 times of an outer diameter of the sintered body, and extruding the sintered body.

* * * * *